United States Patent [19]

Hutt et al.

[11] 4,052,719

[45] Oct. 4, 1977

[54] TELEVISION RECEIVER SYSTEM HAVING FACILITY FOR STORAGE AND DISPLAY OF CHARACTER INFORMATION SELECTED FROM DIGITALLY ENCODED BROADCAST TRANSMISSIONS

[75] Inventors: Peter Richard Hutt, Richmond; Alan Ronald Blake, London; Günter von Cavallar, South Wonston, near Winchester; Brian Neil Douglas, London; Philip John Dodds, Southampton, all of England

[73] Assignee: Independent Broadcasting Authority, London, England

[21] Appl. No.: 682,370

[22] Filed: May 3, 1976

Related U.S. Application Data

[63] Continuation of Ser. No. 493,110, July 30, 1974.

[30] Foreign Application Priority Data

July 30, 1973 United Kingdom ............... 36206/73

[51] Int. Cl.² ........................... G06F 3/14; H04L 7/08
[52] U.S. Cl. ............................... 340/324 AD; 178/30; 340/152 R; 358/147

[58] Field of Search ........... 340/324 A, 324 AD, 152, 340/154; 178/15, 30; 358/147, 148

[56] References Cited

U.S. PATENT DOCUMENTS

| 3,242,470 | 3/1966 | Hagelbarger et al. | 340/324 A |
|---|---|---|---|
| 3,307,156 | 2/1967 | Durr | 340/324 A |
| 3,500,327 | 3/1970 | Belcher et al. | 340/154 |
| 3,961,137 | 6/1976 | Hutt et al. | 358/147 |
| 3,996,583 | 12/1976 | Hutt et al. | 358/147 |

Primary Examiner—Marshall M. Curtis
Attorney, Agent, or Firm—A. W. Breiner

[57] ABSTRACT

According to the invention, a television receiver system comprises selector equipment for selecting information in the form of coded characters, received separately from any picture signals, from a single information channel or a small number of information channels and routing the selected information to a storage device, and a reading device operable, when actuated, to read the information from the storage device repeatedly and feed it, via a character generator, for display by an intensity modulated raster.

21 Claims, 8 Drawing Figures 7 x 5 MATRIX    6 x 4 MATRIX

TELEVISION RECEIVER SYSTEM HAVING FACILITY FOR STORAGE AND DISPLAY OF CHARACTER INFORMATION SELECTED FROM DIGITALLY ENCODED BROADCAST TRANSMISSIONS

This is a continuation of application Ser. No. 493,110 filed July 30, 1974.

The present invention relates to television systems and has as an object the provision of television systems for the presentation of visual displays in a novel and convenient manner.

In any normal television system, the transmission of the wide band video signals which are to produce the actual picture elements on the screen of the receiver, is interrupted between the scanning period for line and field synchronisation purposes. Consequently there are periods during which no video signals are being transmitted. It is now possible to use these periods for the transmission of data which is not necessarily concerned with the video transmission itself.

Basically, data representable by standard graphical symbols, such as alpha-numeric symbols or low definition picture components can be tramsmitted via a restricted channel provided that the rate of transmission is restricted. It is now possible to use periods as aforesaid, especially the line times of the field blanking intervals (i.e., the times of the individual lines occurring between fields which correspond with the times occupied by video signals on active picture lines), hereinafter "LTFB", for the transmission of pages of data. For example, using 8 bit binary digital signals of the complemented type representing alphanumeric characters at a bit rate of 2.5 M bit per second, 50 pages of data each consisting of 22 strips of 40 characters can be transmitted repeatedly in a total cycle time of 90 seconds using only a single line of the field blanking period per field of the 625 line system as operated in the United Kingdom.

There is accordingly a requirement for a convenient form of apparatus for use in the reception of the pages of data.

In accordance with the present invention, there is provided a television receiver system having a memory device for collecting and storing information in the form of coded characters received separately from any video signals, a selector equipment for selecting the information to be stored from a single information channel, or a small number of information channels, of a series of information channels and routing the information to the storage device whilst ignoring the information in the remaining information channels of the series, and a reading device operable, when actuated, to read the information from the storage device repeatedly and feed it via a character generator for visual display in an intensity modulated raster. In a typical use where the receiver system incorporates the normal facilities for video reception, the intensity modulated raster is that provided for the normal video display.

For the purposes of the present invention, a page of a series of the kind hereinbefore described is to be regarded as an information channel and the series of pages is to be regarded as a series of information channels.

The selector equipment is preferbly operable to route the information to the storage device only during periods of time, corresponding with the single information channel or small number thereof, separated by intervals which are long compared with said periods, so that the system is responsive to an information channel received repeatedly at intervals. The said periods may be of a duration corresponding with several fields of a television signal and are distributed through the LTFB periods of the signal. For practical purposes one or two LTFB periods per field are sufficient.

For synchronising the receiving equipment, the portions of data may be transmitted after a run-in signal, for example of 8 identical bits.

Typical data signals are in the form of a run-in, a start code, address information (e.g. page number, and data address) command bits, square bits and the character information. Accordingly, the selector equipment preferably incorporates a start code comparison device and is operable to route information to the memory device only when it is accompanied by a correct start code; the clock circuit of the receiver system is responsive to the run-in transitions in the data waveform and the system incorporates address-responsive means for correctly positioning the segments. The selector may have an input for a code indicative of the required channel and a comparator operable to pass only signals of that channel.

A system as provided by the present invention may simply be provided in such a form as to provide, on a television receiver, a visual display from information transmitted during periods when no video signal is being transmitted on a television channel to which the receiver is tuned. The viewer may then cause the video signal, the characters from the character generator, or both, to be displayed upon the screen of the receiver as required. It is, however, within the scope of the invention to arrange that the memory device can be fed with information transmitted during the non-video periods of another television channel or even transmitted independently of any video signal over a separate data channel. Such separate data channel may be a telephone or other cable network or a radiation and receiver system. Problems of synchronisation may be minimised by providing adequate data storage capacity at the reception point. A separate data channel of low band width can be acceptable if data is transmitted for an adequate proportion of the time.

It is greatly advantageous to employ a memory device of the continuously recirculating or other cyclically accessible type, such as a random access memory cyclically addressed. The stored information can then be fed to the character generator repeatedly after the memory device has been filled for continuous or repeated display, even after transmission of the information has ceased. During normal operation, the memory device stores the information from the selected channel and allows it to be displayed whenever required and continuously for as long as required, even though the transmission of that channel is intermittent (e.g. as in the case of one page selected from a set of 50).

For practical purposes, the character information is normally transmitted in the form of binary signals. Satisfactory results under good conditions of reception such as are normally found within the main service area of a television broadcast transmitter, are obtainable by transmitting the signals in the simple NRZ (non return to zero) form where the zero- and one- characters are simply represented by two different signal levels, one of which is usually zero. For improved reception under difficult conditions, e.g. in fringe areas where noise is significant, the information may be transmitted in biphase form. With this form of transmission, each 1 bit is represented by a 1-level followed by a zero-level and each zero bit is represented by a zero-level followed by a 1-level or vice versa. The rate of transmission of the information is however approximately halved compared with the simple NRZ form. The band-width required with bi-phase transmission is less than twice the bit-frequency. It is a characteristic of bi-phase signals that with any series of bits (each of which involves a transition between two levels, even though it may be identical with the preceding bit), the maximum interval between the transitions can never be longer than the time occupied by one bit. Certain transmission errors are therefore recognisable as such.

Additional advantage may be taken of the said characteristic of bi-phase signals by transmitting, with every portion of data sent during a video interval, a code in which there is at least one interval between transitions which is greater than the said maximum interval. The presence of the code with the portions of data received is at least strongly indicative that the portions of data are genuine, and not, for example, spurious data generated by random interference or derived accidentally from some other data channel.

A convenient page contains 22 (horizontal) strips of 40 characters. An LTFB period does not conveniently allow time for 40 characters to be transmitted using bi-phase signals, though this is readily achieved using simple NRZ signals. Therefore, when bi-phase signals are used each strip may be divided into segments transmitted one in each LTFB period. With four segments per strip (transmitted in four successive LTFB periods), each page is constituted by 88 segments for a 22-strip page. The data address is in the form of a segment address, rather than a simple line address, and operates to position the segments of characters correctly on the screen.

For use with information received in the form of bi-phase signals, the selector equipment advantageously has a pair of data registers arranged so that they are responsive to store the first and second signal levels of each digit respectively and is arranged to pass the information to the memory device only if the data in one register is the complement of the other. In one preferred arrangement the registers of the pair are connected in parallel for the receipt of information and in series at other at other times. Conveniently, the data registers are operated by a control logic circuit which arranges them for the receipt of information only when a start code corresponding with a selected channel has been received.

In a presently preferred form of the system, the memory device is arranged to store the information of a single page selected from information corresponding with a series of pages received in turn, and the reading device is operable to read out the page information from the memory device repeatedly. Compared with arrangements in which the whole of the received information in all the channels is stored, this arrangement is very economic as regards storage capacity. It does not give immediate access to a required page, but this consideration is found to be unimportant since the cycle time for as many as 50 pages is small, even when only one LTFB period per field is used.

As the character generator, it is convenient to provide a generator of the 7 × 5 matrix type. This is a well known type of device which need not be described in detail. It suffices to indicate that for the generation of a line of characters, the generator must be fed with the character information seven times in seven successive line periods.

A system as provided by the present invention may be incorporated in a television receiver, the character generator communicating with the video circuit of the receiver. Alternatively, the character generator may communicate with a modulator to provide a carrier modulated by video signals representing the information. The latter arrangement may be used in an adaptor unit for connection in the aerial cable of an existing receiver so that the receiver may be employed for the present purpose without modification.

The following description in which reference is made to the accompanying drawings is given in order to illustrate the invention. In the drawings:

FIGS. 2, 3 and 4 are concerned with signals of the bi-phase type and a system for the reception thereof. Appropriately modified apparatus may be provided for use with signals of the simple NRZ type.

Figure 1:
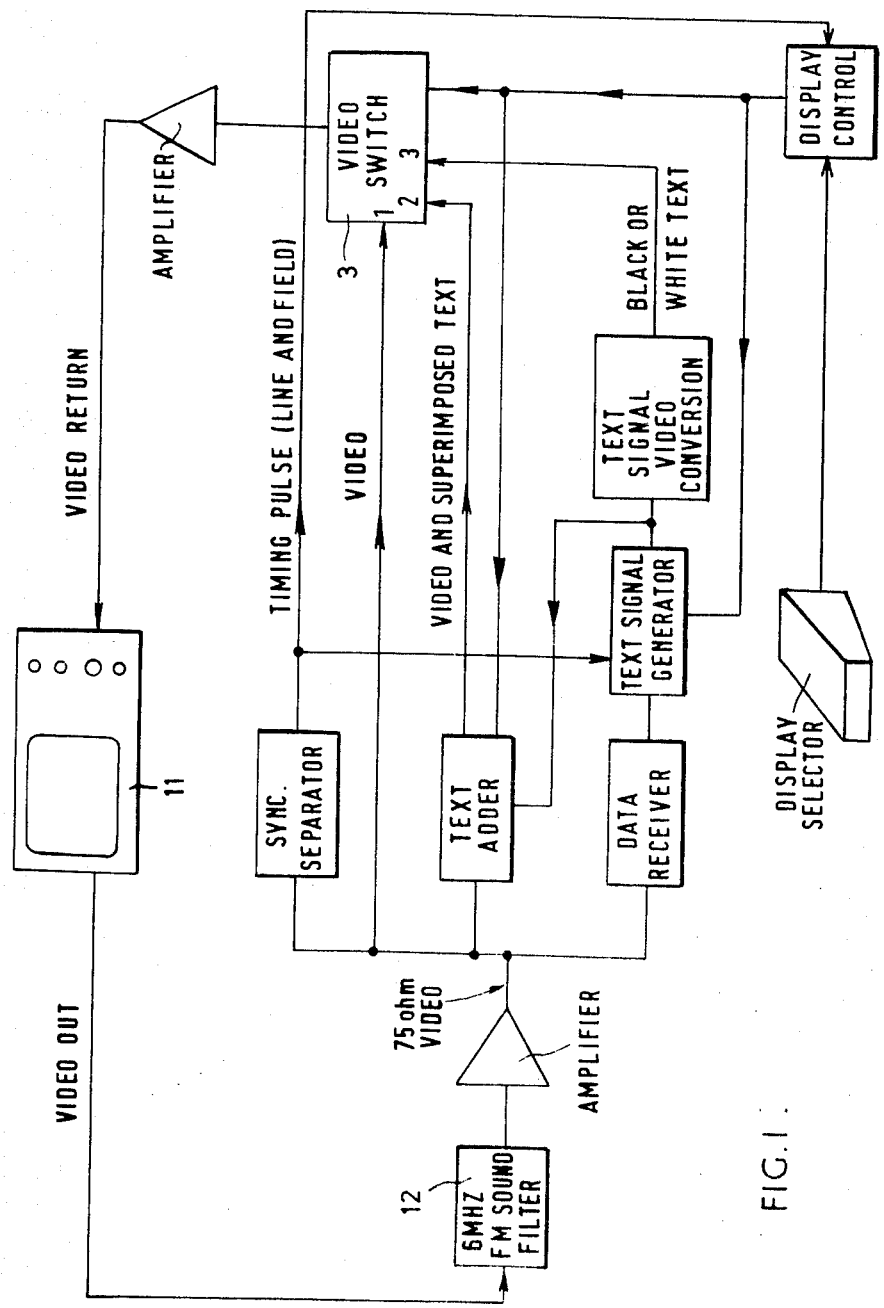
FIG. 1 is a block diagram showing a normal television receiver modified by the addition of a system as provided by the invention.

Referring to FIG. 1, the demodulated television signal to which the television receiver is tuned is taken from the receiver 11 at an emitter follower point. The signal contains 6 $MH_z$ F/M sound which is filtered by filter 12. The signal is then amplified to provide several feeds of 75 ohm video.

The sync separator derives, from the incoming demodulated signal, line and field rate timing pulses which are used in various parts of the system.

One video feed goes direct to part 3 which for simplicity may be regarded as a video switch.

A second video feed to the video switch goes via a text adder. The text adder adds a controlled amount of current to this video signal so that captions are effectively superimposed on the picture correspondng to this video path.

A third video feed passes to the data receiver. The data receiver is exposed to the whole video signal, and can pick out the data signal, discriminating against normal picture signals. Alternatively, the data receiver might be enabled only during the appropriate times when the data lines occur in the signal.

The data receiver presents the data to the stores of the Text Signal Generator. This generates the appropriate text signal at logical (Transistor-Transistor Logic) voltage levels.

The text signal is used to control the text adder and is also passed via a filter and a converter which changes the signal to 75 Ohm video level. This video text signal then passes to another input of the video switch.

The output of the video switch is either input 1, 2 or 3 in the diagram. This passes through an amplifier and returns the signal to the luminance channel of the set (at approximately 5 volts peak to peak in this case).

Control of the display is effected by pressing the appropriate button on the display selector. Possibilities are as follows:

| Button | Video Switch Output |
|---|---|
| Picture only | Input 1 |
| Picture + text (added) | Input 2 |
| Picture + text (non additive) | Input 1 and 3 (whichever is instantaneously greater) simultaneously |
| Text only (black or white text) | Input 3. |

The display control ensures that correct timing is maintained as follows.

Text is only produced during active line time (not during line sync pulses).

Text is not produced during field blanking.

The video switch always passes the input 1 to the output during line and field sync times.

This ensures that the output always contains the correct television synchronising pulses.

Black text or white text is effected by either using normal or inverted polarity text signal under control from the display selector and display control. The display selector also contains a connection to the set which enables the sound output of the set to be muted.

In an alternative arrangement, instead of taking a demodulated signal from the television receiver, an adapter is connected in the aerial lead. In this case the input to the system is at R.F. This is demodulated to video and a similar process performed on the video signal as just described. The resultant video is then remodulated and passed to the antenna input of the television receiver on an appropriate channel.

If data from one television channel is to be displayed over another television channel, then a second R.F. demodulator is required, one to provide the data, the other for normal television programme.

The system of FIG. 1 may be modified to include coloured captions. In this case direct access to the Red, Green, Blue guns of the television receiver is the simplest solution. An R.F. aerial lead adapter would also be possible.

Figure 2:
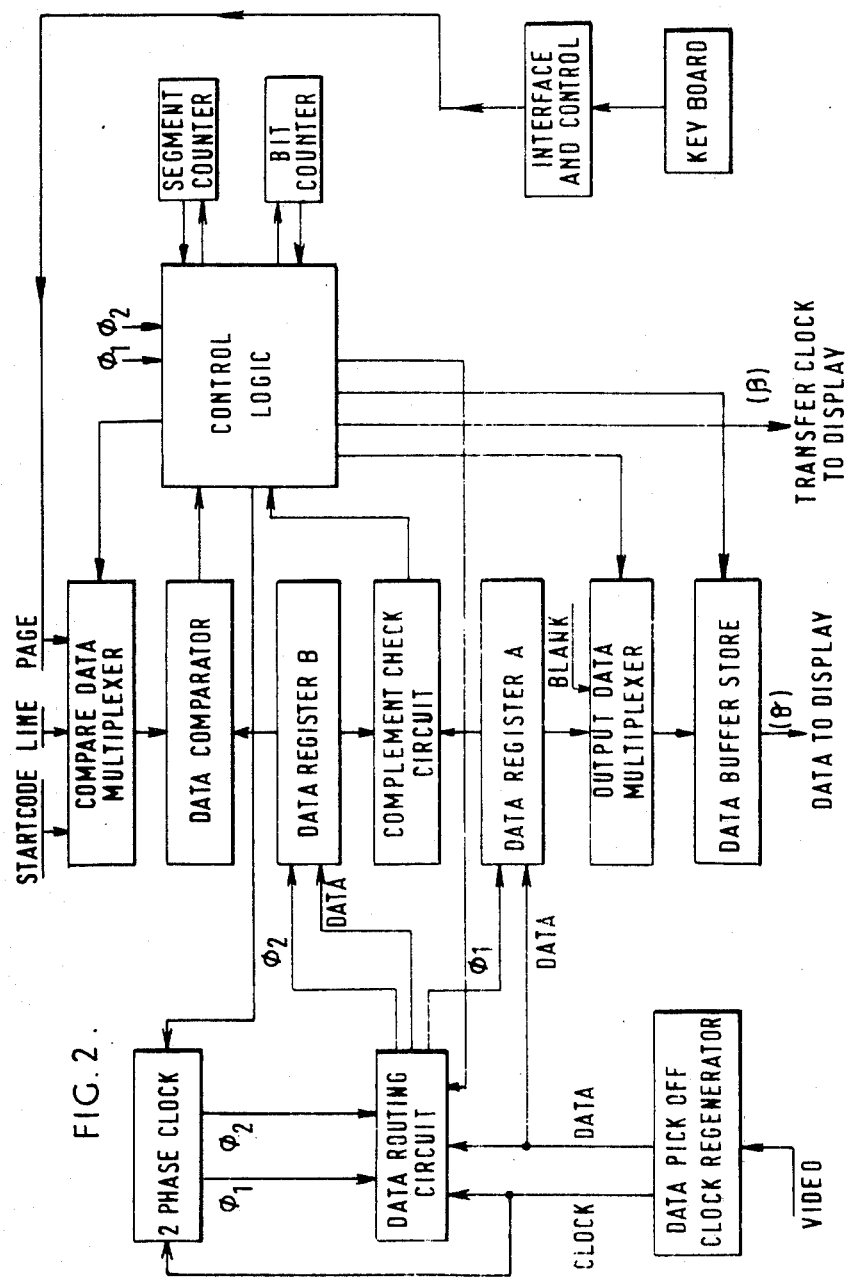
FIGS. 2 and 3 are block diagrams showing parts of the system shown in FIG. 1 in further detail.
Figure 4:
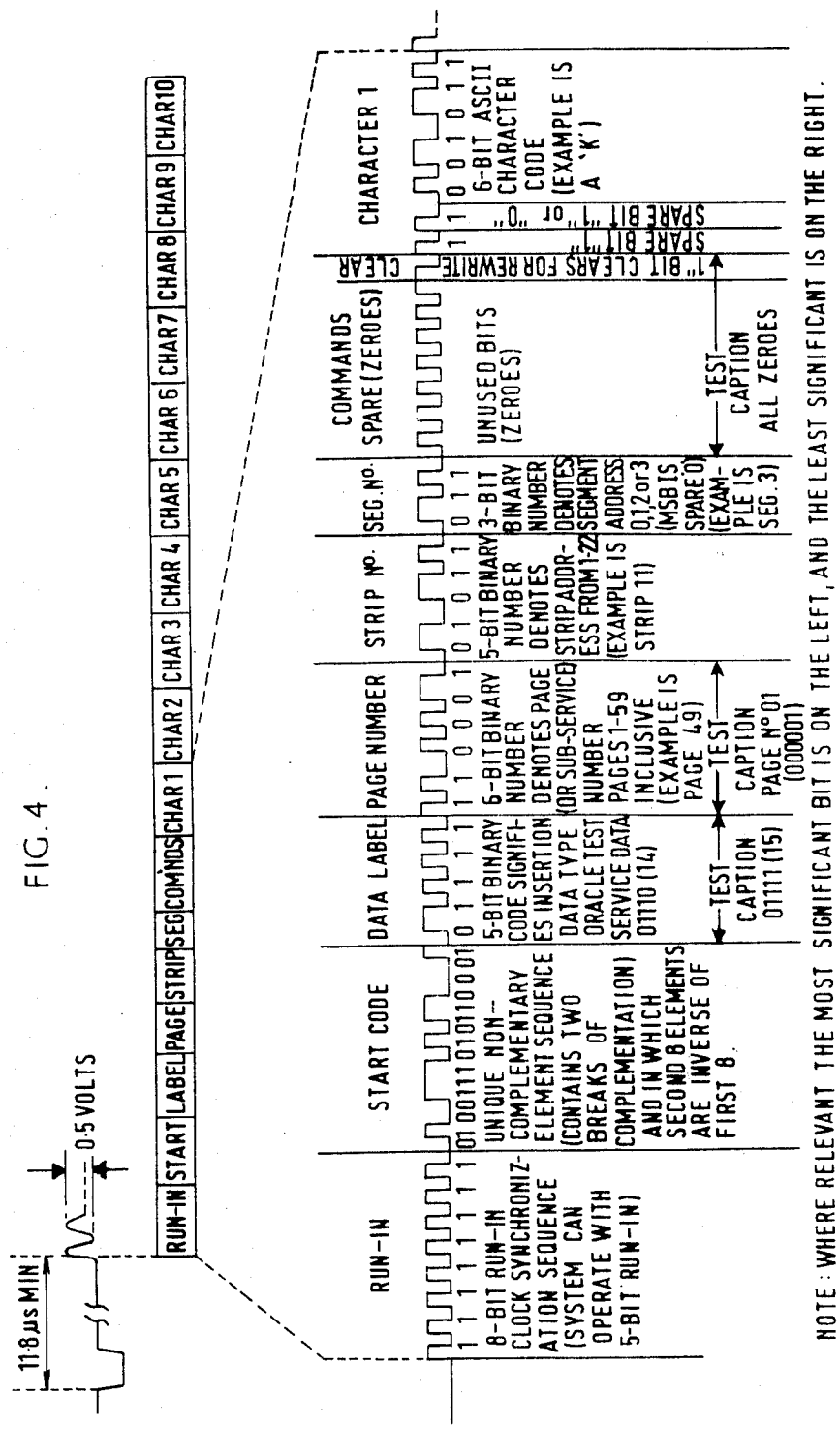
FIG. 4 is a diagram illustrating the form of the data handled, and FIGS. 5A, 5B, 5C and 5D relate to a character rounding system which may advantageously be employed.

The part marked "Data Receiver" in FIG. 1 is shown in detail in FIG. 2. As shown in FIG. 4, the data format consists of 16 parts of varying length excluding the run in. After the start code the signal is in the form of bi-phase bits and the character signals are in a standard ASCII code.

Referring now to FIG. 2, the DATA PICK OFF and CLOCK REGENERATOR presents the DATA ROUTING CIRCUIT with the data and regenerated clock at standard TTL logic levels.

Until a start code has been received the DATA REGISTERS A and B are connected in series via the DATA ROUTING CIRCUIT and data is continuously shifted through the DATA REGISTERS. The receiver recognises a start code by continuously comparing the controls of DATA REGISTER B with the start code applied to the DATA COMPARATOR via the COMPARE DATA MULTIPLEXER. The contents of DATA REGISTERS A and B are also compared in the COMPLEMENT CHECK CIRCUIT to see if the halves of the start code complement each other. When a correct start code has been received the CONTROL LOGIC will store this and increment the DECODE COUNTER by 1 which now points to the part of the data containing the line number.

The CONTROL LOGIC instructs the COMPARE DATA MULTIPLEXER to apply the selected line number to the COMPARATOR and connects the DATA REGISTERS A and B in parallel via the DATA ROUTING CIRCUIT. A TWO PHASE CLOCK is applied to the DATA REGISTERS clocking REGISTER A first and then B. As a BI-PHASE transmission mode is used, the first element of each bit is shifted into DATA REGISTER A and the second element into B. Therefore DATA REGISTER B will contain the inverse data of DATA REGISTER A.

After the correct start code has been recieved and the next 5 bits have been demultiplexed by the two phase clock action and shifted into DATA REGISTERS A and B a strobe pulse is generated by the BIT COUNTER to compare the received data with the selected data label and to check if the contents of DATA REGISTERS A and B complement each other. If so, this again is stored in the CONTROL LOGIC which in turn will increment the DECODE COUNTER by 1, pointing now to the part of the data containing the page number.

A further 6 bits are demultiplexed and shifted into the DATA REGISTERS A and B. A strobe pulse is again generated by the BIT COUNTER to compare the received data with the selected page number and to check if the contents of the two REGISTERS A and B complement each other. This again is stored in the CONTROL LOGIC which increments the DECODE COUNTER by 1, pointing now to the part of the data containing the strip and segment numbers.

If the correct start code and selected line and page number have been received the control logic will pass the next 13 parts of the data (96 bits in 12 8 bit groups) on to the DISPLAY via the OUTPUT DATA SELECTOR and DATA BUFFER STORE. If at any time a complementation error is found within an 8 bit group, a blank is passed on to the DISPLAY instead of the received data within that group. After the 13 parts have been passed on to the DISPLAY the control unit will reset, ready to receive another start code and new data and the cycle is repeated.

Figure 3:
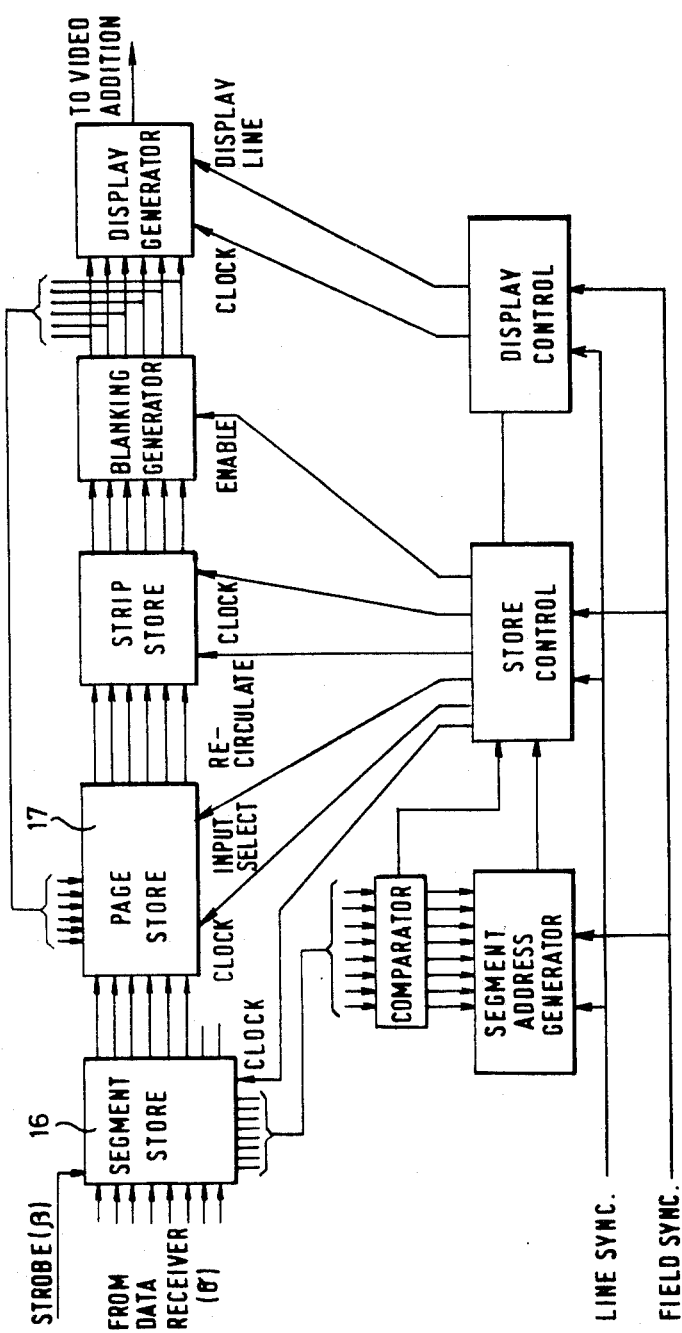

FIG. 3 shows further details of the part marked "Text Signal Generator" in FIG. 1. Data is received in the form of 8 bit parallel words on an eight wire input from the data received from the apparatus of FIG. 2. These words are presented to the input of a segment store 16, consisting of eight 16 bit serial-in parallel-out shift registers. When each word is presented to the input of the store 16, a strobe pulse is applied thus entering the data. Twelve words are clocked into the store, the first of which denotes the row and segment address. If transmission is on two lines per field, two similar segment stores are required, one for each data line received in the field blanking time.

The page store 17 into which the incoming data is clocked at the appropriate time consists of six 1024 bit shift registers. This page store then feeds into a strip store which consists of six 40 bit shift registers. The output of the strip store addresses a character generator via a blanking generator.

In order to print a character on the television screen the ASCII code for that character must be presented to the display generator at the appropriate times on the appropriate lines of the field scan. Since a character generator of the 7 × 5 matrix type is used, this ASCII character code must be presented to the display generator seven times whilst the row number is stepped from 1 through 7. In order to display a strip of 40 characters on the screen the strip store must be rotated 7 times (once per scan line) whilst the row number is stepped from 1 through 7.

For the display of a full page of information the page store must be rotated fully once per picture field, but only in steps of 40 characters corresponding to the last rotation of the strip store.

In fact the strip store is only actually rotated 6 times and on the seventh row the output of the strip store is entered into the front of the page store. Twenty two strips of characters are generated on the screen and each of these consists of four segments.

As the strip store is rotated the seventh time, segment addresses 0 through 3 are generated internally and are compared with the input segment numer which appears at the twelfth position in the line store.

Immediately after each seventh rotation of the strip store, a strip number counter is incremented by one step through the range 1 to 22 and this is compared with the input strip address. When the strip and segment address of input data and currently displayed data are the same, the page store is switched to accept data from the segment store 16. As soon as the local segment address is incremented the page store switches back to accepting data from the strip store.

When a page of data is initially selected one full rotation of the page store is completed with the blanking generator switched on, thus emptying the store of the previous information. The receiver will display a blank screen until such a time that it receives appropriate new data from the text signal generator.

The extreme left- and right-hand segments of strip 1 of all pages may possess a transparent page number of such character that they are displayed whichever page is selected. The left-hand segment may contain the page number actually being transmitted at the particular time, and the right-hand segment may contain the time of day accurate to one second.

Figure 5A:
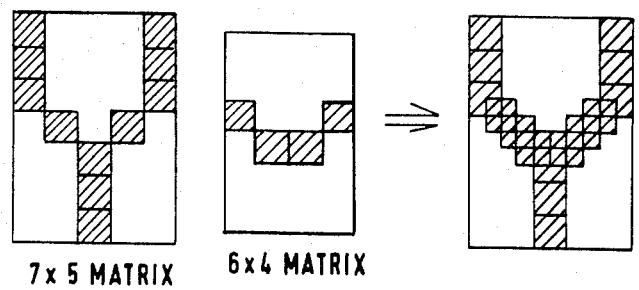

A character rounding system may be provided for improved results. In a preferred system, the main characters are generated in a 7 × 5 matrix arrangement and rounding bits of the characters are generated in 6 × 4 matrix arrangement and superposed in a staggered arrangement — see FIGS. 5A and 5C. This system is very convenient with interlaced scanning.

Figure 5B:
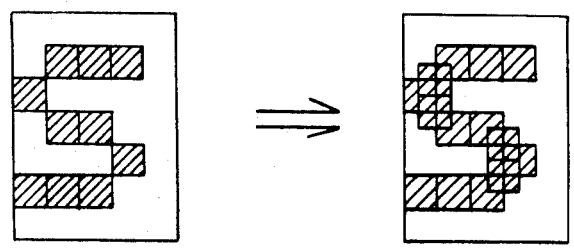
Figure 5C:
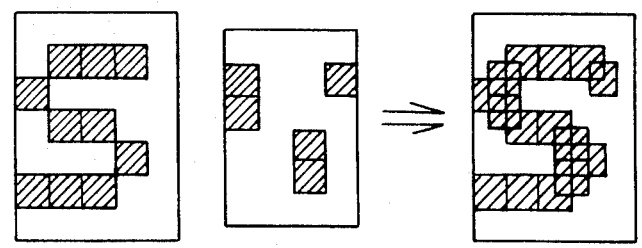

The results are preferable to those shown in FIG. 5B obtained with a system which relies upon generating rounding bits when diagonals are detected — compare FIGS. 5B and 5C.

Figure 5D:
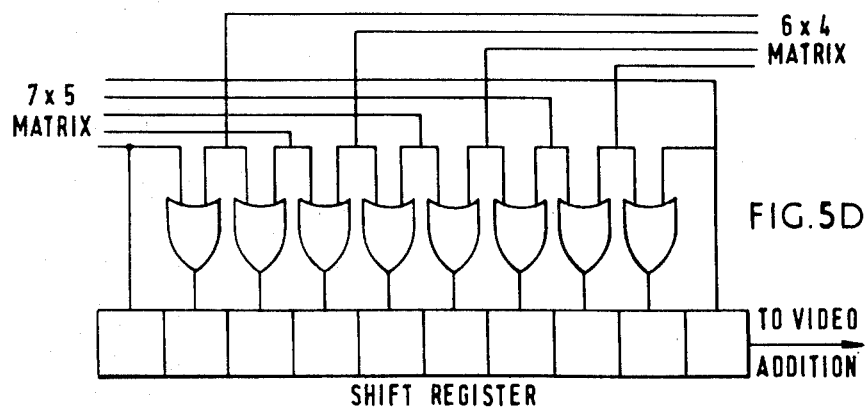

The 7 × 5 and 6 × 4 read only memories (ROM's) required can be produced by standard integrated circuit manufacturing techniques. The two ROM's must be addressed in an out of step fashion, requiring the identification of the two fields involved. FIG. 5D shows an example of a circuit for combining the output of the ROM's.

Reference has been made herein to symbols in the form of low definition picture components as an example of graphical symbols which can be transmitted. Of special interest are symbols derived by filling the positions of a matrix in the various possible combinations. A 3 × 2 matrix, i.e., a matrix having three horizontal rows with two positions in each gives 62 possible graphical symbols derived by inserting from 1 to 5 dots in various distributions in addition to the possibilities of a completely full and a completely empty matrix which are to be regarded as two further graphical symbols. Using symbols of this type arranged, like alpha-numeric symbols on a series of lines, still pictorial matter can be formed. The character generator of the present equipment is therefore usefully arranged to generate such graphical symbols, instead of alpha-numeric symbols, in response to appropriate commands received with the transmission.

We claim:

1. A television receiver system having a memory device, a clocking device for actuating the memory device, an input for a set of pages of information received at said input in the form of digitized characters in a repeated cycle the form of which is such that the digitized characters for the set of pages are received in groups of the characters, and the whole of the information for the set of pages is received during each occurrence of the cycle, each group as received being preceded by a clock run-in signal, to which the clocking device is responsive for synchronization, followed by a known start code correct receipt of which indicates integrity of reception and also followed by a page address code, variable selector means for selecting a page from the set of pages and routing a group of digitized characters to the memory device when the preceding start code is received correctly and the preceding page address code corresponds with the selected page while disregarding digitized groups of characters preceded by an incorrectly received start code and groups of characters preceded by a page address code other than that selected, a reading device operable to read the digitized characters repeatedly from the memory device, and a character generator responsive to the digitized characters read by the reading device to provide output signals for visual display by an intensity modulated raster of the television reception type.

2. A system according to claim 1 for use with information received in the form of binary numbers representing the characters, with each digit represented by one signal level followed by another signal level, in which the selector equipment has a pair of data registers arranged so that they are responsive to store the first and second signal levels of each digit respectively and is arrranged to pass the information to the memory device only if the data in one register is the complement of the other.

3. A system according to claim 2 in which the data registers of the pair are connected in parallel for the receipt of information and in series at other times.

4. A system according to claim 2 in which the data registers are operated by a control logic circuit which arranges them for the receipt of information only when a start code corresponding with a selected channel has been received.

5. A system according to claim 1 in which the selector has an input for a code indicative of the required channel and a comparator operable to pass only signals of that channel.

6. A system according to claim 1 in which the memory device is arranged to store the information of a single page selected from information corresponding with a series of pages received in turn, and the reading device is operable to read out the page information from the memory device repeatedly.

7. A television receiver incorporating a system according to claim 1, the characer generator communicating with the video circuit of the receiver.

8. A system according to claim 1 in which the character generator communicates with a modulator to provide a carrier modulated by video signals representing the information.

9. A system according to claim 1 having a demodulator for television signals, said demodulator being connected with said input.

10. A system according to claim 1 having a second character generator responsive to the digitized characters, said character generator being operable to provide character rounding bits for superposition on the visual display.

11. A ststen according to claim 1 in which the memory device of the continuously re-circulating type.

12. A system according to claim 1 in which the memory device is of the cyclically addressed type.

13. A television receiver system having a video circuit for received video signals in the form of picture signals for display by an intensity modulated raster, said picture signals being separated in time by field blanking intervals each of which occupies several consecutive line periods and equipment for display by the raster of characters on a series of digital information channels received during the field blanking intervals, each member of which series provides a clock run-in signal followed by a known start code and by digitized information, said equipment having a memory device, variable selector means responsive during the line times of the field blanking intervals for selecting a chosen channel from the series of information channels and routing the digitized character information thereof to the memory device when the start code is present on said chosen channel while disregarding the digitized information of the remainder of said series of channels and, when the start code is absent, also disregarding the digitized information of the chosen channel when the start code is absent, a reading device operable to read the digitized information repeatedly from the memory device, a character generator responsive to the information read by the reading device to provide output signals for display by the raster, and a clocking device synchronizable by response to the clock run-in signals and operable to control the memory device and the reading device.

14. A television receiver system having a memory device, a clocking device for actuating the memory device, an input for a set of pages of information received at said input in the form of digitized characters in a repeated cycle the form of which is such that the digitized characters for the set of pages are received in groups of the characters, and the whole of the information for the set of pages is received during each occurrence of the cycle, each group as received being preceded by clock run-in signal, to which the clocking device is responsive for synchronization, followed by a known start code correct receipt of which indicates integrity of reception and also followed by a page address code, variable selector means for selecting a page from the set of pages and routing a group of digitized characters to the memory device when the preceding start code is received correctly and the preceding page address code corresponds with the selected page while disregarding digitized groups of characters preceded by an incorrectly received start code and groups of characters preceded by a page address code other than that selected, a reading device operable to read the digitized characters repeatedly from the memory device, a character generator responsive to the digitized characters read by the reading device to provide output signals for visual display by an intensity modulated raster, a modulator connected with an output for the output signals and operable to provide a television carrier modulated by the output signals and a television receiver responsive to said modulated carrier for providing said display, said carrier having a frequency to which the receiver is tunable.

15. A system according to claim 14 in which the television receiver has a television antenna input and said antenna input is connected with said modulator.

16. A television receiver system having a television receiver with an RF input, a demodulator, a video circuit fed by the demodulator and a visual display for displaying picture signals as an intensity-modulated raster, a memory device, a clocking device for actuating the memory device, an output from the video circuit for data received at said RF input and demodulated by the demodulator, said data representing a set of pages of information in the form of digitized characters in a repeated cycle the form of which is such that the digitized characters for the set of pages are received repeatedly in groups of the characters and the whole of the information for the set of pages is received during each occurrence of the cycle, each group as received being preceded by a clock run-in signal, to which the clocking device is responsive for synchronization, followed by a known start code correct receipt of which indicates integrity of reception and also followed by a page address code, variable selector means for selecting a page from the set of pages and routing a group of digitized characters to the memory device when the preceding start code is received correctly and the preceding page address code corresponds with the selected page while disregarding digitized groups of characters preceded by an incorrectly received start code and groups of characters preceded by a page address code other than that selected, a reading device operable to read the digitized characters repeatedly from the memory device, and a character generator connected with the video circuit and being responsive to the digitized characters read by the reading device to provide character signals for visual display by the display device.

17. A system according to claim 16 having a video switch between the character generator and the video circuit and arranged to provide a choice between display of normal video signals alone, character signals alone, and character signals superimposed on normal video signals.

18. A television system having a memory device, a clocking device for actuating the memory device, an input for a set of pages of information received at said input in the form of digitized characters in a repeated cycle the form of which is such that the digitized characters for the set of pages are received in groups of the characters, and the whole of the information for the set of pages is received during each occurrence of the cycle, each group as received being preceded by a clock run-in signal, to which the clocking device is responsive for synchronization, followed by a known start code correct receipt of which indicates integrity of reception and also followed by a page address code, variable selector means for selecting a page from the set of pages and routing a group of digitized characters to the memory device when the preceding start code is received correctly and the preceding page address code corresponds with the selected page while disregarding digitized groups of characters preceded by an incorrectly received start code and groups of characters preceded by a page address code other than that selected, a reading device operable to read the digitized characters repeatedly from the memory device, a character generator responsive to the digitized characters read by the reading device to provide output signals for visual display by an intensity modulated raster of the television reception type, and a second character generator responsive to the digitized characters, said second character generator being operable to provide character rounding bits for superposition on the visual display.

19. A system according to claim 18 in which the character generator is operable to generate main characters in an $m \times n$ matrix form and to generate the rounding bits in an $(m - 1) \times (n - 1)$ matrix form.

20. A television receiver system having a parallel binary digital memory device, a clocking device for actuating the memory device, an input for receiving a demodulated television signal carrying, during picture-free periods thereof, a set of pages of information in the form of serial binary digitized characters provided in a repeated cycle the form of which is such that the digitized characters for the set of pages are received in groups of the characters, which groups are received each in a different one of said periods and the whole of the information for the set of pages is received during each occurrence of the cycle, each group as received being preceded by a clock run-in signal, to which the clocking device is responsive for synchronization, followed by a known start code, selector means responsive to page address codes present in the cycle, for selecting a page from the set of pages and routing a group of digitized characters, with conversion from the serial binary form to the parallel binary form, to the memory device when the preceding start code is received and the preceding page address code corresponds with the selected page while disregarding digitized groups of characters preceded by a page address code other than that selected, a reading device operable to read the digitized characters repeatedly from the memory device, a character generator responsive to the digitized characters read by the reading device to provide output signals for visual display, as characters, by an intensity modulated raster, together with or separately from picture signals carried by the said signal and an arrangement for optionally routing to the memory device alternative character information received over a separate data channel so that characters derived from the alternative character information can be displayed together with or separately from the said picture signals.

21. A television receiver system having a parallel binary digital memory device, a clocking device for actuating the memory device, an input for receiving a demodulated television signal carrying, during picture-free periods thereof, a set of pages of information in the form of serial binary digitized characters provided in a repeated cycle the form of which is such that the digitized characters for the set of pages are received in groups of the characters, which groups are received each in a different one of said periods and the whole of the information for the set of pages is received during each occurrence of the cycle, each group as received being preceded by a clock run-in signal, to which the clocking device is responsive for synchronization, followed by a known start code, selector means responsive to page address codes present in the cycle, for selecting a page from the set of pages and routing a group of digitized characters, with conversion from the serial binary form to the parallel binary form, to the memory device when the preceding start code is received and the preceding page address code corresponds with the selected page while disregarding digitized groups of characters preceded by a page address code other than that selected, a reading device operable to read the digitized characters repeatedly from the memory device, a character generator responsive to the digitized characters read by the reading device to provide character signals for visual display, as characters by an intensity modulated raster, a text adding device responsive to the picture signal component of the demodulated television signal and the character signals to produce a signal representing the picture signal with superimposed text and controller means operable to provide as required for display, the character signals alone, the said picture component alone, or the said picture signals together with characters.

* * * * *

UNITED STATES PATENT OFFICE
CERTIFICATE OF CORRECTION

Patent No. 4,052,719     Dated October 4, 1977

Inventor(s) Peter Richard HUTT ET AL

It is certified that error appears in the above-identified patent and that said Letters Patent are hereby corrected as shown below:

Column 2, line 11, "square" should read -- spare --;

Column 2, line 17, after "run-in" insert -- and --;

Column 7, line 59, "special" should read -- especial --;

Column 9, claim 11, line 9, "ststen" should read -- system --;

Column 9, claim 11, line 10, after "device" insert -- is --;

Column 10, claim 17, line 42, after "play" insert -- on the visual display --;

and

Column 10, claim 18, line 45, after "television" insert -- receiver --.

Signed and Sealed this

Twenty-sixth Day of August 1980

[SEAL]

Attest:

SIDNEY A. DIAMOND

Attesting Officer     Commissioner of Patents and Trademarks